Oct. 14, 1958   R. KAISER   2,855,809
CONTROL DEVICE FOR CIRCULAR SAW SHARPENING MACHINES
Filed Dec. 12, 1956   3 Sheets-Sheet 1
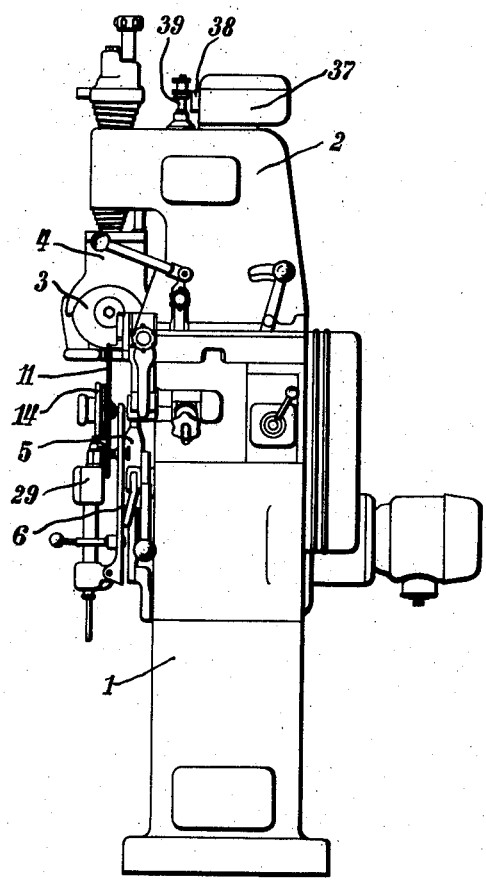
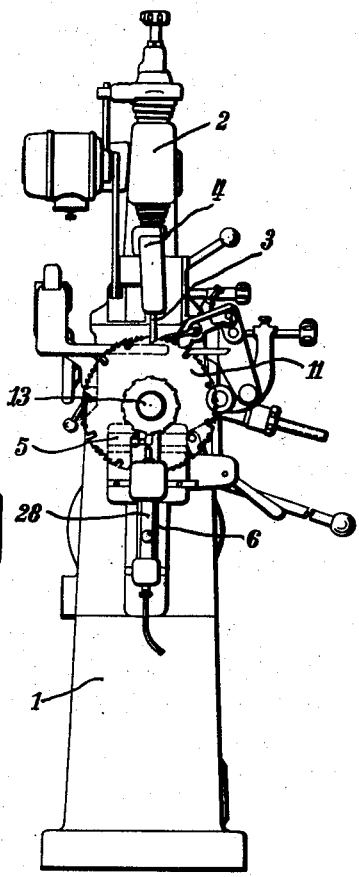
Inventor:
Richard Kaiser
By: Alex. E. MacRae
Attorney Oct. 14, 1958  R. KAISER  2,855,809
CONTROL DEVICE FOR CIRCULAR SAW SHARPENING MACHINES
Filed Dec. 12, 1956  3 Sheets-Sheet 2
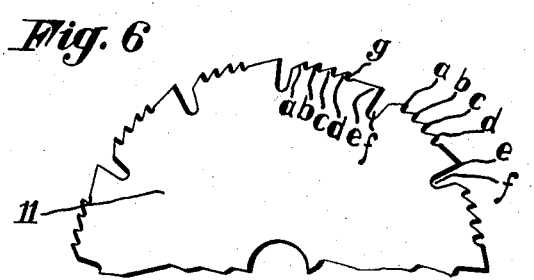
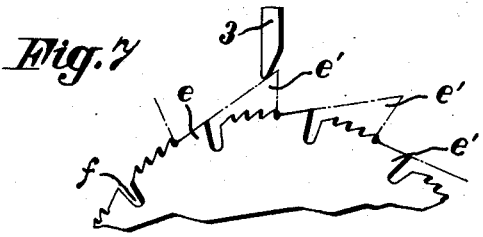
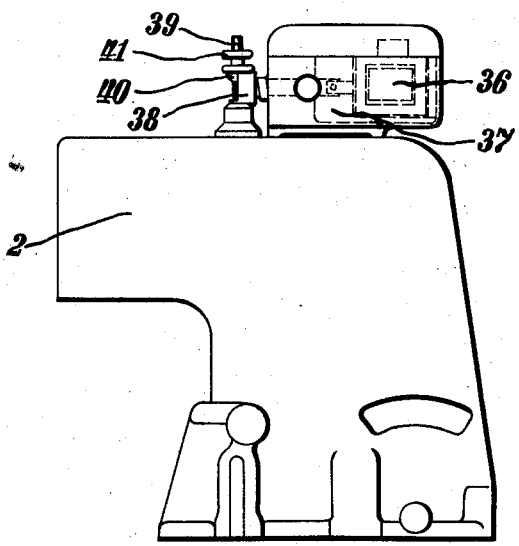
Inventor
Richard Kaiser
By: Alex E. MacRae
Attorney Oct. 14, 1958   R. KAISER   2,855,809
CONTROL DEVICE FOR CIRCULAR SAW SHARPENING MACHINES
Filed Dec. 12, 1956   3 Sheets-Sheet 3

Inventor:
Richard Kaiser
By: Alex. E. MacRae
Attorney

United States Patent Office 2,855,809
Patented Oct. 14, 1958

2,855,809

CONTROL DEVICE FOR CIRCULAR SAW SHARPENING MACHINES

Richard Kaiser, Biberach Wurttemberg, Germany

Application December 12, 1956, Serial No. 627,918

7 Claims. (Cl. 76—77)

This invention relates to a control device for circular saw sharpening machines.

A problem is involved in economically sharpening circular saw blades, particularly those in which different kinds of teeth are arranged in groups. Each group of teeth comprises a leading cutting tooth and a number of following, so-called clearing teeth. Between the individual groups, which are idential with each other, the circular saw blade is provided with comparatively large radial notches or gaps.

Special sharpening machines for circular saws having a complicated change-over apparatus for intermittent advancing with an index plate corresponding exactly to the saw, may be provided. Such an expensive machine, however, is beyond the means of the medium or small plant in the wood processing industry.

The present invention is based upon the idea of adapting the conventional saw sharpening machine for sharpening the above-mentioned type of blade. Heretofore, such sharpening has been done by hand.

The present invention includes a control device wherein a controlling cam disc may be connected to the circular saw blade. The cam disc actuates means which holds the grinding disc in tooth disengaged position after the clearing teeth of a group have been sharpened and then releases the grinding wheel into tooth grinding position only after the blade has been advanced to the first of the next group of clearing teeth. By means of this control, all the clearing teeth of all groups of teeth can be sharpened automatically with a single revolution of the saw blade carried out by means of an advancing mechanism.

After all the clearing teeth have been shaped the control mechanism is disengaged. The conventional advancing ratchet is then set for the distance corresponding to the individual groups of teeth and the stroke of the grinding wheel is increased. The backs of the leading cutting teeth are then sharpened automatically during a second revolution of the circular saw blade.

Figure 4:
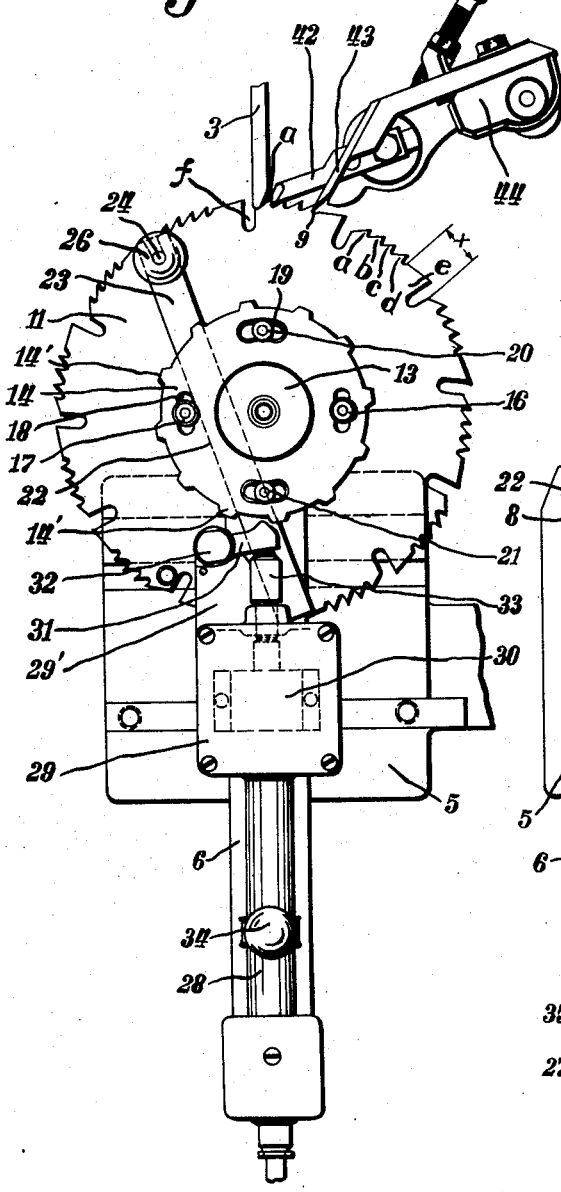
Figure 5:
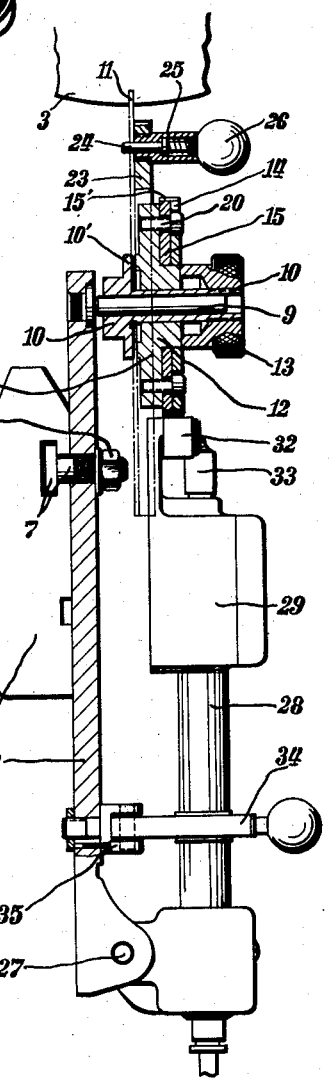

Other features of the invention will become apparent from the following description with particular reference to the accompanying drawings in which Figure 1 is a side elevation of a sharpening machine in accordance with the invention, Figure 2 is a front elevation of the machine, Figure 3 is an enlarged side elevation of the upper portion of the machine, Figure 4 is a enlarged front elevation of the control mechanism, Figure 5 is an enlarged side elevation, partly in section, of the control mechanism, and Figures 6 and 7 are partial side views of the circular saw blade.

A housing 2 is mounted upon a supporting base 1 of a conventional automatic saw sharpening machine. Grinding wheel 3 is suspended from housing 2 and is rotatably mounted in a support 4.

Support 4 is an element of a conventional mechanism for imparting up and down motion to the grinding wheel in a blade sharpening cycle. This mechanism may include conventional means for changing the angular setting of the vertical axis of the grinding wheel should it be necessary to sharpen saw blades in which the teeth are ground at angles in alternating directions. The usual saw mounting member 5 is supported on base 1 and is vertically movable thereon by conventional means.

The control mechanism in accordance with the invention includes a vertical rail-like support 6 which is connected to the member 5 as by a slotted screw 7 and nut 8. A horizontal bolt 9 is fixed to the upper end of support 6, and a split sleeve 10 with a collar 10' is rotatably mounted on bolt 9. The saw blade 11 is fitted over the sleeve 10 with one side in engagement with collar 10' and a spring plate 12 is also fitted over the sleeve for engagement with the other side of blade 11. A knurled nut 13 clamps the assembly in place. As shown, nut 13 threadedly engages an external thread on the end of sleeve 10. Rigidly fixed to plate 12 is one, and preferably two, axially aligned control cam discs 14, 15. The perimeters of the discs 14, 15 are provided with similarly shaped control cams 14', 15', the number of cams for each disc corresponding to the number of groups of teeth on the saw blade 11. Discs 14, 15 are secured together by means of screws 16, 17. These screws extend through elongated holes 18 in the front disc 14 and are threaded into the back disc 15, whereby the discs may be rigidly secured together in various relative rotative positions. As shown in Figure 4, the cams 14', 15' are in aligned or coincident relation.

When secured together, discs 14, 15 may in turn be fixed to spring plate 12 in various rotative positions relative thereto. For this purpose, each disc 14, 15 is provided with elongated holes 19 through which threaded bolts 20, 21 extend and screw into spring plate 12.

Setting means for plate 12 includes a groove extending chordally through the plate and into which a bar 23 may be inserted for rotative adjustment of the plate 12 and, therefore, the discs 14, 15. In the inserted position of the bar in Figure 4, it lies directly in front of saw blade 11. At its free end, bar 23 carries a guide sleeve 25 in which a pin 24 is reciprocally mounted. Pin 24 is spring-urged towards the saw blade and is provided with a handle 26 for manual reciprocation in the opposite direction.

An arm or tubular member 28 is swingably mounted by means of a pin 27 on the lower end of support 6. Member 28 carries at its upper end, a switch housing 29 containing an electric switch 30. The wires leading to the switch are conveniently lead through the tube 28. A switch lever 31 is pivotally mounted by means of a pin 32 on a projection 29', on switch housing 29. Switch lever 31 rests freely on switch pin 33 of switch 30 and is engageable by cams 14', 15'. The pivotal mounting of the switch assembly, by means of tube 28 and pin 27, facilitates the mounting of the blade and cam assembly on sleeve 10. Means for retaining the tube 28 and switch mechanism carried thereby in operative position comprises a lever 34 swingably mounted on support 6 by means of a yoke 35 and which clamps onto tube 28.

In the electric circuit (not shown) of switch 30 is an electromagnet 36 positioned in a small housing 37 mounted on the top of housing 2. The armature of electromagnet 36 is fixed to a locking bolt 38 which is spring-urged outwardly from the electromagnet. A vertical rod 39 is slidably guided in a mounting on top of housing 2 and is fixed to the conventional grinding wheel cycling mechanism by any suitable means. For instance, rod 39 may be fixedly linked to support 4. A rimmed nut 40 is positioned on rod 39 by means of a locking nut 41.

Means for advancing saw blade 11 comprises a conventional first advancing ratchet 42 and a second ratchet 43 which are adjustably connected to the advancing mechanism 44 in the usual manner.

In the example shown in Figures 4, 6 and 7, the circular saw has twelve groups of teeth. Accordingly, the control cam disc 14, and if present, control cam disc 15, is provided with twelve controlling cams on its circumference. The individual groups of teeth in the example shown, as seen in the sharpening and advancing direction, consist of four similar clearing teeth, $a, b, c, d$ and a differently shaped, longer, leading cutting tooth $e$. The individual groups of teeth $a$ to $e$ are separated from each other by the comparatively large gaps $f$.

In operation, and after circular saw 11 is mounted on split sleeve 10, spring plate 12 and clamping nut 13 are also mounted on the sleeve, but final tightening of the circular saw between collar 10' and spring plate 12 is deferred.

Adjusting bar 23 is slid into its guide 22 in spring plate 12. This, of course, could also be done before the spring plate was mounted on the sleeve. Pin 24 is now drawn back by hand and fitted, on being slowly released, into one of the circular saw blade gaps $f$, as shown in Figure 4. Circular saw 11 is now in the correct position relative to control cam disc 14 because guide 22 is so designed to ensure such correct position. Saw blade 11 and spring plate 12 are now clamped together firmly by tightening clamping nut 13, after which adjustment bar 23 is drawn out in its longitudinal direction. As shown in Figure 4, in this position switch lever 31 is not in contact with any of control cams 14'.

Since circular saws are seldom identical, especially when of different manufacture and even when they are of the same type, and since gaps $f$ may also vary, a compensating adjustment can also be carried out on the circular saw, if necessary. After loosening retaining screws 16 and 17, the two cam discs 14 and 15 are rotated somewhat relative to each other, thereby increasing the effective length of the individual control cam 14' by means of the control cam 15' situated behind it, up to twice its length. In other words the effective cam area 14' and 15' can be adjusted corresponding to the interval denoted in Fig. 4 by $x$. The interval $x$ denotes the advancing path of circular blade 11 over which the grinding disc motion must be cut out. When in correct position, cam discs 14 and 15 are secured firmly together by tightening screws 16 and 17.

The thrust of grinding disc 3 and the path of advancing ratchets 42, 43 are adjusted on the saw sharpening machine in usual manner to effect sharpening of the small clearing teeth $a, b, c, d$. Grinding wheel 3 is run in by hand in order to sharpen the back of clearing tooth $a$, after which the automatic sharpening machine is placed in operation. The sharpening of the four clearing teeth $a, b, c, d$ now follows in the usual manner, advancement always being carried out by the first ratchet 42. When griding wheel 3 has arrived at the root denoted by a small $g$ after the last clearing tooth $d$ and begins to rise again, control cam 14' situated closest to switch lever 31 will have reached this lever which is now depressed by the control cam. Switch 30 is thus switched off by switching pin 33. Simultaneously, electromagnet 36 becomes demagnetized, thus releasing locking bolt 38 which is now forced by its spring against the rim of nut 40 mounted on rod 39. As soon as the ascending grinding wheel, together with rod 39 has reached its highest position locking bolt 38 latches below the rim of nut 40 so that further motion of the grinding wheel is prevented, i. e., it can no longer move downwardly. In the meantime, circular saw 11 is advanced by the second ratchet 43, engaging at tooth $a$ of the next group of teeth. This second ratchet is necessary because in this phase of advance the first ratchet 42 does not find any point of engagement on the long leading cutting tooth $e$. Since the circular saw 11 has been advanced in the described manner through one group of teeth $a$ to $e$, switching lever 31 is again released by the control cam 14' so that the spring loaded switching bolt 33 returns automatically to its upper position shown in Figure 4. As a consequence, the circuit of electromagnet 36 is again closed by switch 30, locking bolt 38 is retracted and the grinding wheel together with rod 39 is once more free to move so that the grinding wheel can resume its sharpening on the back of clearing tooth $a$ of the next group of teeth and can continue automatically until the clearing teeth of this second group have been sharpened. The above-described sequence of operations is then repeated with intermittent locking of the grinding wheel motion. In this way, all clearing teeth of saw blade 11 are automatically sharpened.

The sharpening machine is now turned off and the advancing path of the first ratchet 42 together with the stroke of grinding wheel 3 are adjusted as if it were intended to sharpen the teeth $e'$ indicated by broken and dotted lines in Figure 7. As Figure 6 shows, the backs of the actual leading cutting teeth $e$ form part of the backs of the large teeth $e'$. The grinding wheel is now run in so that it engages at the beginning of the back of a leading cutting tooth $e$, whereupon the sharpening machine is turned on again. During the second rotation of circular saw 11 which now follows, the backs of the leading cutting teeth $e$ are automatically ground or sharpened in succession.

After these two rotations of circular saw 11 it is completely sharpened, so that another saw blade to be sharpened can be mounted in the machine. If the next circular saw to be sharpened is of exactly the same form as the previously sharpened saw blade, only the correct position of the circular saw relative to the control cam discs will have to be adjusted in the above described manner by means of adjusting bar 23.

If the saw blade is somewhat different an adjustment can be carried out by loosening screws 20 and 21 and adjusting control cam discs 14 and 15 relative to spring plate 12. This last adjustment is only necessary, however, the first time the control mechanism is fitted to a particular type of saw.

It is obvious that where the grinding is oblique, care must be taken to see that the griding wheel is introduced into the gaps between the teeth of the circular saw at the right angular setting for sharpening the first teeth.

Although the locking of the grinding wheel in its highest position as described above is by electrical means 30, 36, other means, such as one of a mechanical or pneumatic type may be used.

There are circular saws of the kind herein described which do not possess the gaps denoted by $f$, which are called chip breakers. In this case the adjustment of the control cam disc by means of adjusting bar 23 will be carried out in such a way that pin 24 of the adjusting bar fits into any given gap between the teeth of the saw. For example, pin 24 may be brought against the front of a leading cutting tooth $e$.

It is not intended that the invention be restricted to the described manner of operation of latches 42, 43. It is also possible to effect the advancement of the saw by means of a shifting wheel or graduated plate rotating with it, in which case the design of the graduated plate will correspond either exactly to the teeth of the saw, or to only the leading cutting teeth of the saw.

It will be apparent that the machine is effective in sharpening blades in which leading teeth and clearing teeth are of different heights.

The control mechanism described has the additional advantage that it is not only applicable to the manufacture of new sharpening machines, but can be readily associated with available sharpening machines.

I claim:

1. In a sharpening machine for a circular saw blade having different kinds of teeth arranged in groups, said machine having means for rotatively advancing said saw blade and a grinding wheel having a cyclical, up and down motion, a control mechanism therefore comprising a cam disc removably fixed to said circular saw blade and having a cam surface on the periphery thereof, and a switch having an actuating member engageable by said cam surface in response to rotation of said disc, a latch for locking said grinding wheel in tooth-disengaged position to interrupt its cyclical motion, means responsive to actuation of said switch to actuate said latch, said switch responsive means being movable on disengagement of said switch actuating member by said cam surface to release said latch and free said grinding wheel for resumption of its cyclical motion.

2. In a sharpening machine for a circular saw blade having a plurality of groups of teeth, at least one tooth in each group being different from the remaining teeth in said group, said machine having means for rotatively advancing said saw blade and a grinding wheel having a cyclical, up and down motion, a control mechanism therefor comprising a cam disc removably fixed to said blade and having a plurality of uniformly spaced projecting cams on the periphery thereof, each cam having a length corresponding to the distance between two similarly positioned teeth of succeeding groups, a latch for locking said grinding wheel in tooth disengaged position to interrupt its cyclical motion, a member successively engageable by each said cam on rotation of said disc and movable thereby to actuate said latch, said member having movement to release said latch on disengagement by each said cam thereby to free said grinding wheel for resumption of its cyclical motion, said cams in response to one revolution of said saw blade and cam disc alternately locking and releasing said grinding wheel to effect the sharpening of similar teeth in successive groups.

3. In a sharpening machine for a circular saw having a plurality of groups of teeth, at least one tooth in each group being different from the remaining teeth in said group, said machine having a shaft on which said circular saw is mounted, means for rotatively advancing said saw blade and a grinding wheel having a cyclical, up and down motion, a control mechanism therefor comprising a pair of cam discs mounted on the shaft, each said cam disc having a plurality of uniformly spaced projecting cams on the periphery thereof, each cam on one disc constituting an extension of a cam on the other disc on relative rotation of said discs, means clamping said discs together for relative rotative adjustment to produce a plurality of effective cam surfaces, means removably clamping said discs to said saw blade for relative rotative adjustment, each said cam surface having a length corresponding to the distance between two similarly positioned teeth of succeeding groups, a latch for locking said grinding wheel in tooth disengaged position to interrupt its cyclical motion, a member successively engageable by each said cam surface on rotation of said disc and movable thereby, means responsive to movement of said member to actuate said latch, said member having movement to release said latch on disengagement by each said cam surface thereby to free said grinding wheel for resumption of its cyclical motion, said cam surfaces in response to one revolution of said saw blade and cam discs alternately locking and releasing said grinding wheel to effect the sharpening of similar teeth in successive groups.

4. Control mechanism as defined in claim 3, said latch actuating means comprising a switch operable by movement of said member, and electromagnetic means energizable on closure of said switch to release said latch.

5. Control mechanism as defined in claim 3, including means for adjusting the rotative position of said cam discs relative to said saw blade comprising a plate clamped to said saw blade, a bar engageable with said plate to rotate said plate and saw blade, and a pin projecting laterally from said bar for registry with a selected position on said saw blade.

6. Control mechanism as defined in claim 3, said machine having a base, and a vertically adjustable saw mounting member mounted on said base, a rail-like support fixed to said mounting member and carrying said shaft at its upper end, and an arm swingably connected to the lower end of said support and carrying said cam engageable member.

7. Control mechanism as defined in claim 6, said latch actuating means including a switch operable by movement of said cam engageable member, a housing on said arm containing said switch, said cam engageable member being pivotally mounted on said housing, and electromagnetic means energizable on closure of said switch to release said latch.

References Cited in the file of this patent

UNITED STATES PATENTS

| | | |
|---|---|---|
| 1,226,329 | Hansen | May 15, 1917 |
| 1,254,253 | Marchant | Jan. 22, 1918 |
| 1,401,696 | Hedstrom | Dec. 27, 1921 |
| 2,097,001 | Taylor | Oct. 26, 1937 |
| 2,716,908 | Lundberg | Sept. 6, 1955 |